ated Sept. 2, 1969

3,465,074
METHOD OF HOT PRESSING LiF

Norbert Neuroth and Klaus Warnach, Mainz-Mombach, Germany, assignors to JENAer Glaswerk Schott & Gen., Mainz, Germany, a corporation of Germany
Filed Nov. 22, 1966, Ser. No. 596,233
Claims priority, application Germany, Nov. 7, 1966,
J 29,448
Int. Cl. B29d 11/00; B29c 1/04; B29f 5/00
U.S. Cl. 264—125                                        5 Claims

ABSTRACT OF THE DISCLOSURE

The articles of the invention are manufactured by introducing lithium fluoride powder into a mold and compressing said powder therein for a period of 5 to 30 minutes at a temperature of 400 to 550° C. and a pressure from 5000 to 10000 atmospheres. Before the lithium fluoride powder is introduced into the mold it is subjected to a drying period of about one hour at a temperature of 750° C.

---

Figure 1:
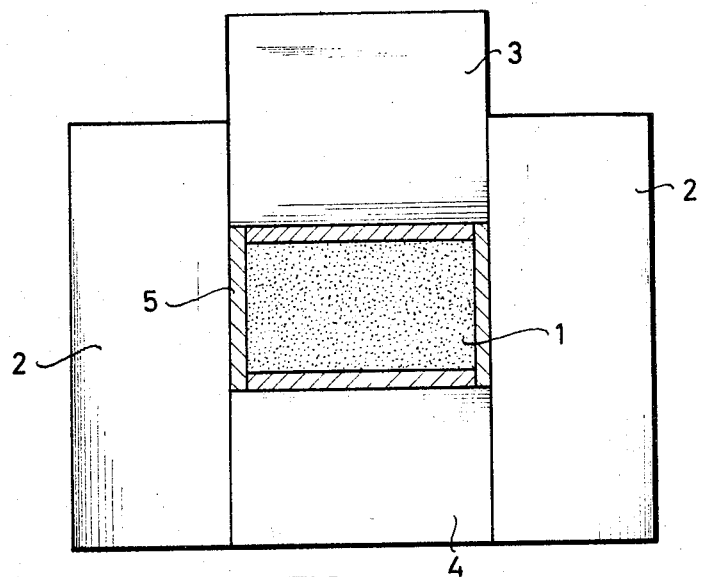

The invention relates to a method for the manufacture of articles which possess a high permeability to radiation in the visible and the infrared spectral range.

It is known to produce optical materials having a high degree of permeability in the infrared spectral range by pressure sintering of $MgF_2$ or $CaF_2$. Magnesium fluoride and calcium fluoride have large Abbe numbers in the spectral range between 1 and 2 $\mu$m., with $MgF_2$ having the number 61 and $CaF_2$ having the number 85. For producing lens combinations it is, however, desirable to combine optical parts having large and small Abbe numbers. Lithium fluoride has the small Abbe number 47 in the spectral range between 1 and 2 $\mu$m. and it is therefore particularly well suited in lens combinations for the production of an IR objective.

It is known to grow mono-crystals of LiF which possess a good permeability in the visible and in the infrared spectral range. The growth of LiF mono-crystals is, however, a rather elaborate process, particularly when large pieces are to be produced.

The present invention has as its object a method for the manufacture of articles having a high radiation permeability in the visible and in the infrared spectral range which is simple to practice and which produces compact articles which are free from schlieren and gas inclosures.

In accordance with the invention this problem is solved in that lithium fluoride powder is introduced in a mold and is compressed at a temperature of 400–550° C. at pressures from 5000 to 10000 atmospheres.

The articles produced according to this method are polycrystalline and have a good homogeneousness. A molded article of this kind having a thickness of about 2 mm. still possess a permeability of 50% at a wavelength of 7.2 $\mu$m. Because of their low refractive indices these articles are particularly suitable for optical purposes.

It has furthermore been found that a grain size distribution as it is obtained by the usual disintegration means, such as a mortar or a ball mill, is completely satisfactory for the desired purpose. Of importance for the optical homogeneousness is, however, that the starting material has a high degree of chemical purity.

In the following will be described an example of the method according to the invention.

With hydrofluoric acid as an agent, lithium fluoride is precipitated from a watery lithium carbonate solution. The precipitate is filtered off and is subsequently dried at 150° C. for about 20 minutes. This is followed by a second drying period of about one hour at a temperature of 750° C. The powder thus pre-dried is placed in a metal mold. In this mold the lithium fluoride powder is compressed for 5 to 10 minutes at a temperature of 500° C. and at a pressure of 8000 atm. Subsequent measurements showed that a plate 2 mm. thick has a permeability of at least 50% up to a wavelength of 7.2 $\mu$m.

Figure 2:
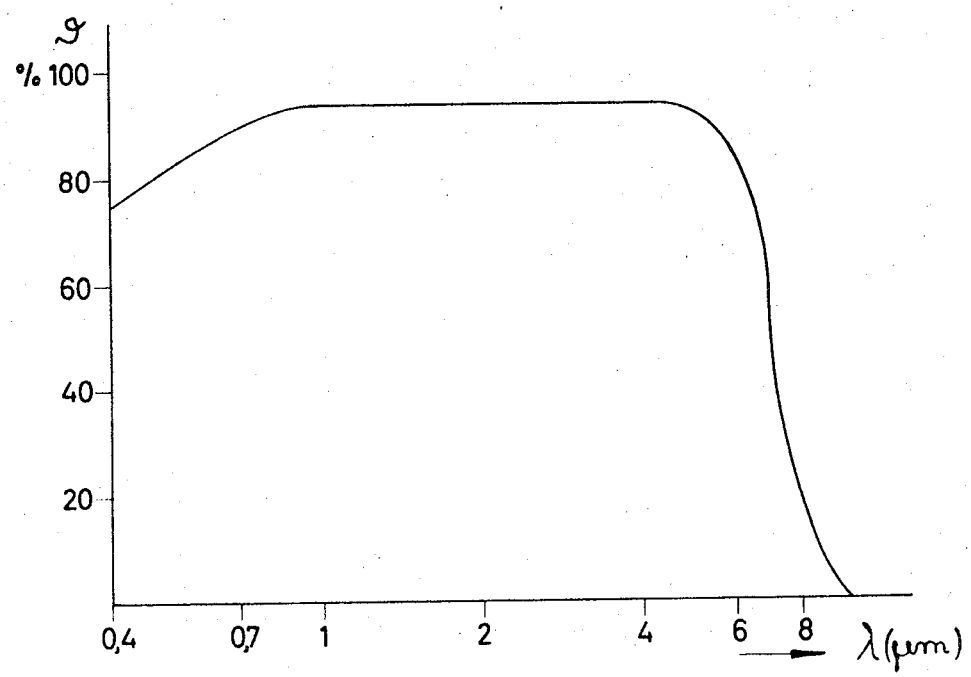

Another example of practicing the method of the invention will be described in the following with reference to the accompanying drawings, in which:

FIG. 1 illustrates an apparatus for the manufacture of the articles of the invention, and FIG. 2 is a graph illustrating the relationship between the permeability and the wavelength of the completed article.

From lithium carbonate in combination with hydrofluoric acid is produced lithium fluoride. The lithium fluoride is filtered off and subsequently is dried for about 20 minutes at a temperature of 150° C. This is followed by a second drying period extending to about one hour at a temperature of 750° C. The lithium fluoride powder thus produced is compressed in the apparatus illustrated in FIG. 1 to a compact, polycrystalline material. For this purpose the dried—and if desired pre-compressed—powder 1 is placed between two dies 3 and 4 in a metal mold 2. In this mold the powder is subjected for 30 minutes to a temperature of 400 to 550° C. and a pressure of 5000 to 10,000 atmospheres, preferably 8000 atm. In order to prevent the lithium fluoride from adhering to the inner walls of the mold during the compacting process, it is advisable to put an embedding medium 5, such as graphite, between the lithium fluoride 1 and the adjacent walls of the mold parts 2, 3 and 4.

The permeability $\vartheta$ of a 2 mm. thick plate manufactured in this manner is graphically illustrated in FIG. 2. As is apparent from the characteristic C, a permeability of at least 50% up to a wavelength $\lambda$ of 7.2 $\mu$m. is achieved.

What we claim is:

1. A method for the manufacture of articles having a high degree of radiation permeability in the visible and in the infrared spectral range, in which lithium fluoride in the form of a powder is introduced in a mold and is compressed therein at a temperature of 400 to 550° C. and at pressures from 5000 to 10000 atmospheres.

2. A method according to claim 1, in which said lithium fluoride powder is dried before it is compressed.

3. A method according to claim 1, in which said lithium fluoride powder is compressed at said temperature and said pressure for a period of 5 to 30 minutes.

4. A method according to claim 1, in which said lithium fluoride powder is dried before it is deposited in said mold.

5. A method according to claim 1, in which said lithium fluoride powder is dried for a period of about one hour at a temperature of 750° C. before it is deposited in said mold.

(References on following page)

References Cited

UNITED STATES PATENTS

| | | | |
|---|---|---|---|
| 2,149,076 | 2/1939 | Stockbarger | 23—88 |
| 2,362,430 | 11/1944 | Buerger | 264—66 |
| 2,550,173 | 4/1951 | Swinehart et al. | 23—88 |
| 3,178,307 | 4/1965 | Carnall et al. | 264—1 |
| 3,359,066 | 12/1967 | Hatch et al. | 264—1 |
| 3,365,271 | 1/1968 | Carnall et al. | 264—1 |

OTHER REFERENCES

Kreidl et al., "Fabrication—By Hot Pressing—," Bausch & Lomb, ASTIA AD 233–358. In the Scientific Library, 1965, TA 430B8. Pp. 8, 9, 12, 35, 43, 44, 92.

JULIUS FROME, Primary Examiner

A. H. KOECKERT, Assistant Examiner

U.S. Cl. X.R.

23—88; 264—1

UNITED STATES PATENT OFFICE
CERTIFICATE OF CORRECTION

Patent No. 3,465,074            September 2, 1969

Norbert Neuroth et al.

It is certified that error appears in the above identified patent and that said Letters Patent are hereby corrected as shown below:

In the heading to the printed specification, line 7, "Nov. 7, 1966" should read -- Nov. 23, 1965 --.

Signed and sealed this 21st day of April 1970.

(SEAL)
Attest:

Edward M. Fletcher, Jr.           WILLIAM E. SCHUYLER, JR.
Attesting Officer                 Commissioner of Patents